United States Patent
Ramesh et al.

(10) Patent No.: US 6,651,159 B1
(45) Date of Patent: Nov. 18, 2003

(54) FLOATING POINT REGISTER STACK MANAGEMENT FOR CISC

(75) Inventors: Tiruvur R. Ramesh, Newark, CA (US); Sanjay Mansingh, Santa Clara, CA (US); Korbin Van Dyke, Sunol, CA (US)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/449,956

(22) Filed: Nov. 29, 1999

(51) Int. Cl.[7] .......................... G06F 9/455; G06F 9/302
(52) U.S. Cl. ................ 712/209; 712/210; 712/222; 712/41; 712/43; 712/23; 712/229; 711/171
(58) Field of Search .................... 714/38, 34, 35, 714/45; 717/128, 138; 712/23, 24, 225, 209, 227, 240, 41, 43, 210, 222, 229; 711/171, 212; 710/307

(56) References Cited

U.S. PATENT DOCUMENTS 3,707,725 A * 12/1972 Dellheim ..................... 714/38
5,685,009 A * 11/1997 Blomgren et al. ............ 712/23

\* cited by examiner

Primary Examiner—Daniel H. Pan
(74) Attorney, Agent, or Firm—Vedder, Price, Kaufman & Kammholz, P.C.

(57) ABSTRACT

A floating point register stack for a processor combines a plurality of two general purpose registers to form a register stack for x86 instructions and leaves the remaining general purpose registers for native instructions of the processor. By mapping x86 sources into the stack of two general purpose registers and operating x86 instructions on the x86 stack, the register stack for the processor is able to support both the processor's native instruction set and the x86 instruction set without increasing the size of the register stack.

12 Claims, 4 Drawing Sheets

FLOATING POINT REGISTER STACK MANAGEMENT FOR CISC

BACKGROUND OF THE INVENTION

1. Field of the Invention

The present invention relates to microprocessor architecture and, in particular, to floating point register architecture.

2. Discussion of the Related Art

With the advent of more and more different types of computer systems and microprocessors, the number of different instruction sets for such systems continues to increase. Certain existing instruction sets, such as the x86 instruction set developed by Intel Corporation of Santa Clara, Calif. for its family of microprocessors, predominate the computer system market. Thus, by designing new microprocessors having the capability of operating with both an existing instruction set and an instruction set native to the new microprocessor, the value of the new microprocessor increases because the new microprocessor will be able to execute a wider range of applications. Native instructions are instructions that are decoded and executed by the processor directly. Because the x86 instruction set is so widely used for such a large number of applications, a major objective for developers of new microprocessors is to design their microprocessors or central processing units (CPUs) for compatibility with both the x86 instruction set and the computer's native instruction set.

The x86 instruction set is executed by complex instruction set computer (CISC) processors, while native instruction sets are typically executed by reduced instruction set computer (RISC) processors. For applications to run in either or both instruction sets, data and other information in floating point registers should be shared between RISC programs and CISC programs. Floating point numbers include a fraction or mantissa portion and an exponent portion. Formats for floating point data are typically wider than for integer data, e.g., 64 or 80-bit formats for floating point numbers compared to a 32-bit format for integers. CISC processors typically support a wider floating point format of 80 bits, while RISC only provides for a 64-bit format. Therefore, because of the different length formats for CISC and RISC processors, or similarly between x86 and native instruction sets, sharing data between the two data formats is not easily accomplished.

One way to share data and other information is to store the data in a register within the CPU before switching to the alternate instruction set and then to read the register by the instruction set. However, this requires that the registers be readable by either instruction set and that the instruction sets be extended to provide instructions to read the additional registers, thereby increasing the complexity and size of the CPU.

Another way to share data is to provide two sets of register stacks for the CPU, one set for the use of x86 instructions and a second set for the use of native instructions. Register stacks reside on the CPU die, which has a limited space available for registers. Thus, any additional registers require increasing the size of the CPU die or deleting functions of the CPU to free up die space for the additional stack. As a result, using two sets of register stacks increases size and cost and/or reduces efficiency of the computer system.

Accordingly, it is desired to have register stacks which support both CISC (e.g., x86 instructions) and RISC (e.g., native instructions) architectures for a dual-instruction-set CPU without the problems discussed above with respect to conventional methods.

SUMMARY OF THE INVENTION

According to the present invention, a floating point register stack combines pairs of data registers to form wider data registers such that different types of instruction sets with wider data formats can be supported. Thus, the resulting register stack can support both the processor's native instruction set and a wider instruction set, such as the x86 instruction set. Instructions map 80-bit x86 instructions into two 64-bit native general purpose registers to provide the required functions of an x86 floating point stack, which allows the processor greater flexibility to run an greater number of operations and applications.

The present invention will be more fully understood in light of the following detailed description taken together with the accompanying drawings.

BRIEF DESCRIPTION OF THE DRAWINGS

Use of similar reference numbers in different figures indicates similar or like elements.

DETAILED DESCRIPTION

Figure 1:
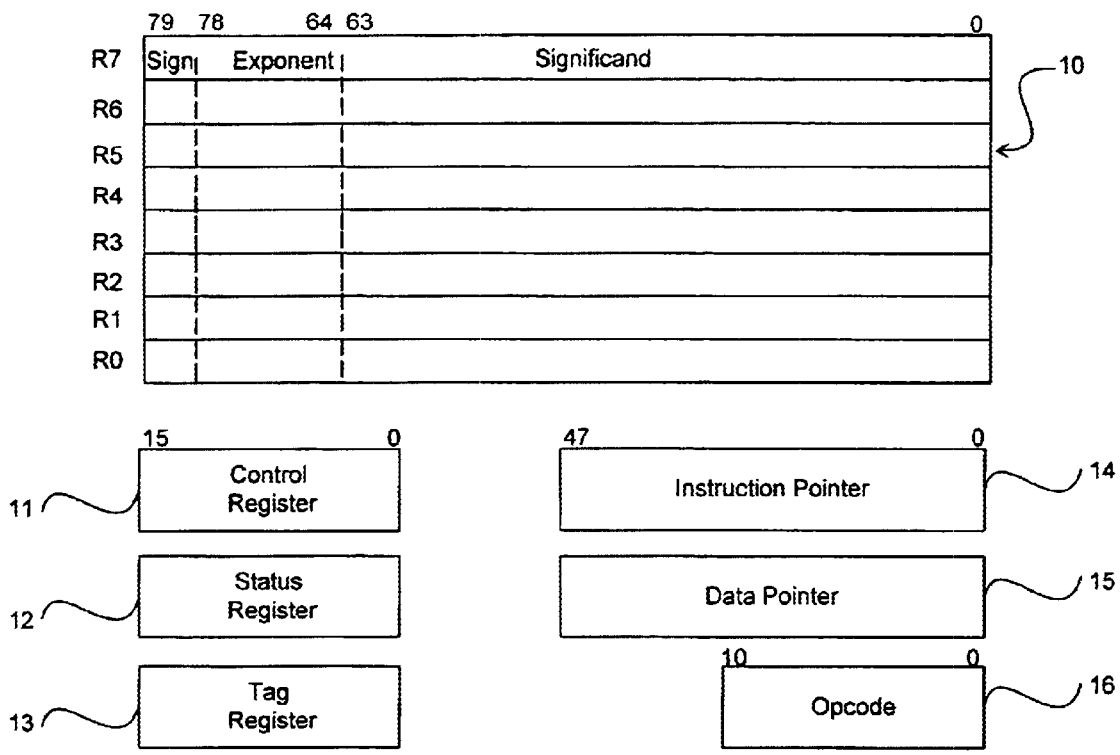
FIG. 1 shows blocks for an x86 FPU execution environment.

A computer processor unit (CPU) can employ a stack for managing data, such as a floating point unit (FPU) register stack. FIG. 1 shows an x86 FPU execution environment, which includes a register stack 10, a control register 11, a status register 12, a tag register 13, an instruction pointer 14, a data pointer 15, and an opcode register 16. FPU register stack 10 is an array of eight 80-bit data registers R0 to R7 that store data in extended-real format. When integer or floating point data is loaded from memory into any one of registers R0 to R7, the data is converted to extended-real format, which is 80 bits in size, with a 64-bit mantissa or significand, a 15-bit exponent, and one sign bit. The exponent is biased for single and double precision formats so that a separate sign bit for the exponent is not needed. Integer data formats are typically 32-bits in width or size, while floating point formats include more bits of precision by having a significand of 24, 53 or 64 bits. The range of these floating point formats is also increased by having exponents of 8, 11, or 15 bits. Standard or single-precision floating point uses 32 bits, with a sign bit, an 8-bit exponent, and a 23-bit mantissa. The double-precision floating-point format uses 64 bits, with a sign bit, an 11-bit exponent, and a 52-bit mantissa. RISC processors use both single and double precision floating point formats. CISC processors use these formats in addition to the extended-real precision. When data is transferred back to memory, the data is converted back to the original format, i.e., integer, single, double, or extended-precision.

Control register 11 is a 16-bit register for controlling the precision and rounding modes for x86 floating point instructions. Status register 12 is a 16-bit register which indicates the current state of the FPU and includes the FPU busy flag, top-of-the-stack (TOS) pointer, floating point condition code flags, error summary status flag, stack fault flag, and exception flags. Tag register 13 is a 16-bit register for keeping track of the contents of each of the eight FPU data registers R0 to R7. Tag register 13 is divided into eight 2-bit portions, each 2-bit portion representing a data register, with register R0 represented by the two least significant bits and register R7 represented by the two most significant bits. Each 2-bit portion indicates whether the associated register is empty or not and the type of data within the register. Instruction pointer 14 and data pointer 15 are located in 48-bit registers. Instruction pointer 14 contains a pointer to the last non-control floating point instruction executed, and data pointer 15 contains a pointer to the data operand for the last non-control floating point instruction executed. Opcode register 16 is an 11-bit register containing the opcode of the last non-control floating point instruction. Additional details about the x86 FPU execution environment can be found in Intel Pentium Processor Manuals, available through Intel Corporation of Santa Clara, Calif.

FPU instructions address the data registers relative to the top of the stack (TOS). Special instructions facilitate accessing the desired data in register stack 10. For storing or writing new data from memory to register stack 10, the TOS pointer is first decremented by a "decrement" instruction to the next unoccupied register location and then data is "pushed" onto this unoccupied location by a "push" instruction. For example, if register R4 is at the top of the stack, TOS pointer is decremented to point to register R3, and data is written into register R3, which is now the top of the stack. Data can be pushed onto the registers until register R0 is reached and written into. The next attempt to write data into register stack 10 results in a stack overflow exception.

For reading data off the top of the stack (or storing data from the top of the stack to memory), data is read or "popped off" at the location pointed to by the TOS pointer by a "pop" instruction. The TOS pointer is then incremented by an "increment" instruction to point to the previous data in the stack, which is now the new top of the stack. For example, if the top of the stack is register R3, the data in register R3 is read and stored into memory. The TOS pointer is incremented to point to register R4 which is the new top of the stack. When a pop instruction causes the TOS pointer to point to an empty register, a stack underflow exception occurs.

Most x86 instructions require both reading and writing at the top of the register stack, and once the result of the floating point instruction is obtained, the result is written to the top of the stack. The result then needs to be moved off the register at the top of the stack so that data from another register can be moved to the top of the stack for the next instruction. As a result, operands or data may need to be moved regularly to and from the register at the top of the stack. A floating point exchange (FXCH) instruction exchanges contents of the register at the top of the stack with the contents of a register at another portion of the stack. The FXCH instruction is useful because exchanging the contents of two registers can be performed with one instruction, thereby increasing efficiency and throughput. For example, data can be moved from register R4 to the top of the stack and from the top of the stack to register R4 with a single FXCH instruction. Because the FPU register stack for x86 instructions consists of only eight registers, the FXCH instruction is needed to allow data to be moved into and out of the stack so that desired operations can be performed.

Whereas CISC processors use 80-bit registers to read and write x86 instructions, RISC processors typically only use 64-bit general purpose registers to execute native instructions. Therefore, for processors designed with only 64-bit registers, a register stack management is desired so that these processors can also accommodate x86 instructions requiring 80-bit registers.

Figure 2:
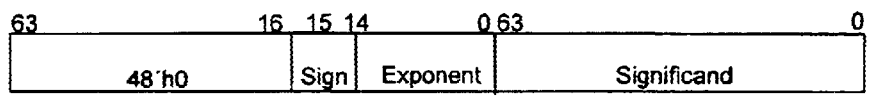
FIG. 2 shows two 64-bit registers paired to produce a register capable of an 80-bit format.

FIG. 2 shows two 64-bit registers paired to produce a register capable of 80-bit extended precision format. For 80-bit extended precision, the 64 bits of the significand or mantissa are completely stored in one register. The 15 bits of the exponent and the one sign bit are stored in the 16 lowest bit positions of the paired register. The remaining 48 bits of the 64-bit paired register are unused, although other information could be stored in these 48 unused bit positions.

Figure 3:
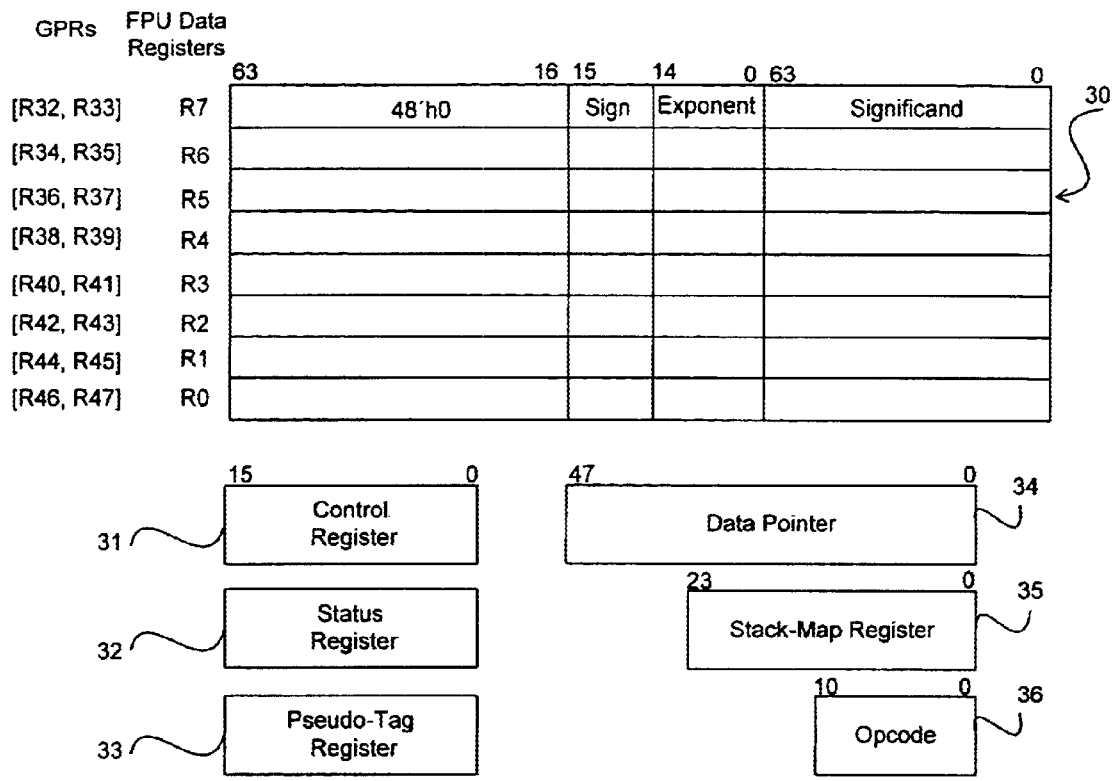
FIG. 3 shows blocks for a multi-media execution environment having the ability to support x86 instructions.

FIG. 3 shows a multi-media FPU execution environment capable of supporting x86 programs, which includes a register stack 30, a control register 31, a status register 32, a pseudo-tag register 33, a data pointer 34, a stack-map register 35, and an opcode register 36. The multi-media register set includes sixty-four 64-bit general purpose registers GPR0 to GPR63. Since there are only eight 80-bit x86 floating point registers, pairing two multi-media registers for each x86 register requires only sixteen of the sixty-four multi-media floating point data registers. Another eight of the general purpose registers are used for the x86 integer general purpose registers. The remaining forty registers include a hard-wired zero, a call/return linkage register, and registers for hardware (conversion) and software temporaries.

In multi-media register stack 30, registers GPR32 to GPR47 are designated for x86 instructions, where successive registers are paired together and where the odd register is used for the 64-bit mantissa and the even register is used for the 15-bit exponent and one-bit sign. As shown in FIG. 3, multi-media register stack 30 pairs together registers GPR32 and GPR33 to map into x86 register R7 of FIG. 1, through to registers GPR46 and GPR47 to map into x86 register R0. The x86 operands or data are loaded or stored into the pair of multi-media registers by first checking the lowest 16 bits of the even register for exceptions and then loading or storing the 15-bit exponent and one-bit sign into the 16 lowest bit positions of the even register, followed by loading or storing the 64-bit mantissa into the odd register.

16-bit control register 31 and status register 32, 48-bit data pointer 34, and 11-bit opcode register 36 are similar to control register 11, status register 12, data pointer 15, and opcode register 16, respectively, for the x86 execution environment of FIG. 1. Data pointer 34 contains a pointer to the memory operand of the last FP x86 instruction. The 48-bit pointer consists of a 16-bit selector and a 32-bit offset in the data segment. Opcode register 36 contains the 11-bit opcode of the last FP x86 instruction.

Figure 3A:
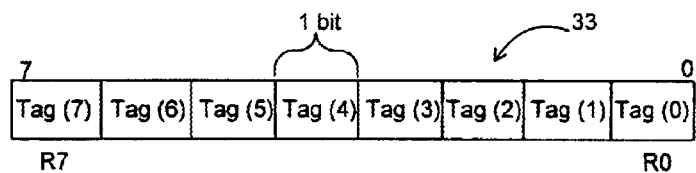
FIGS. 3A and 3B show the pseudo-tag register and stack map register, respectively, of FIG. 3.
Figure 3B:
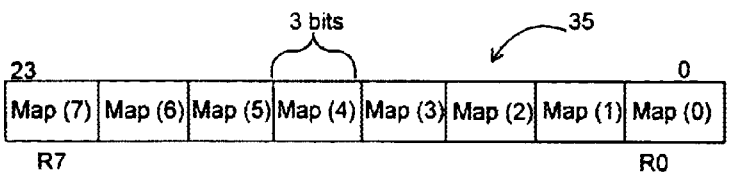

Pseudo-tag register 33, shown in FIG. 3A, is an 8-bit register containing one bit for each of the eight paired registers in stack 30, according to one implementation. The lowest bit represents register R0 at the top of the stack, and the highest bit represents register R7 at the bottom of the stack. The bit corresponding to each register denotes whether the corresponding data register is empty or not and is used to detect stack overflow and underflow exceptions. Stack-map register 35, shown in FIG. 3B, is a 24-bit register for mapping x86 data registers to the general purpose data registers. Stack-map register 35 contains eight 3-bit elements, with each element representing an x86 data register R0 to R7. The lowest 3-bit element represents the register at the top of the stack, and the highest 3-bit element represents the register at the bottom of the stack. Every stack element can be mapped into one of eight general purpose registers, as designated by the three bits in each 3-bit element.

Figure 4:
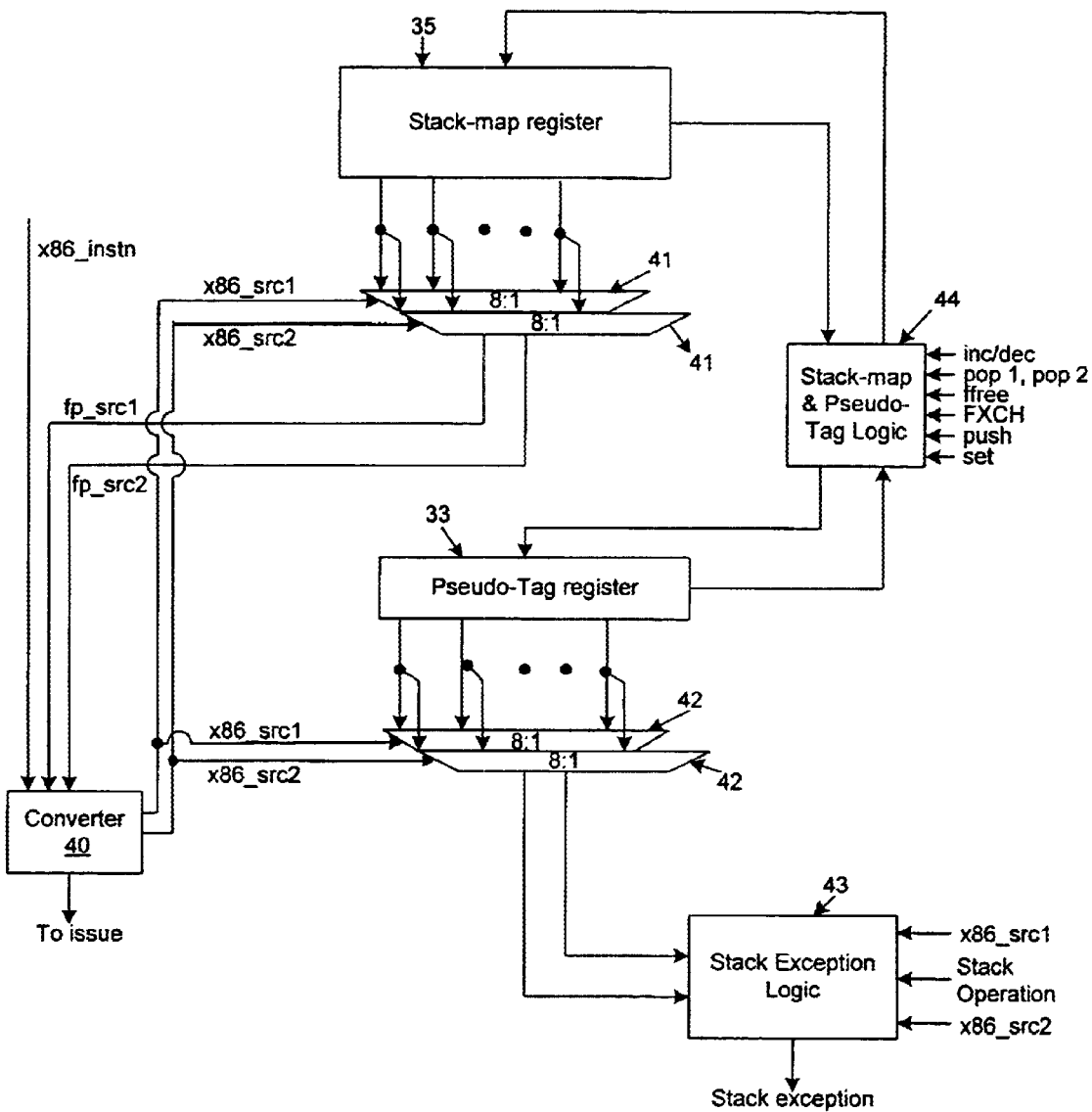
FIG. 4 is a block diagram of an implementation for x86 register stack management.

FIG. 4 is a block diagram of an implementation for x86 register stack management. A converter 40 receives variable length x86 instruction bytes (x86_instn), converts them to a sequence of fixed length native multi-media instructions, and determines the location of the two x86 sources in the x86 FPU register stack to be used for execution of the x86 instruction. Converter 40 also maps the x86 stack to the general purpose registers. The x86 FPU stack identifier for the first source (x86_src1) is then used as an input to an 8:1 multiplexer 41 to select the 3-bit element from stack map register 35 corresponding to the first source identifier. For example, if the data or operand in data register R1 (top of the stack minus one) is identified by the first source identifier as the first source of the x86 instruction, multiplexer 41 outputs 001 as the multi-media floating point GPR identifier for the first source (fp_src1). Converter 40 then accesses the location designated by fp_src1 for use by the issuer. Similarly, the x86 FPU stack identifier for the second source (x86_src2) is used as an input to an 8:1 multiplexer 41 to select the 3-bit element from stack map register 35 corresponding to the second source identifier. The multi-media floating point GPR identifier for the second source (fp_src2) is then used by converter 40 to obtain the second source for the x86 instruction.

The x86 FPU stack identifiers x86_src1 and x86_src2 are also used as inputs to 8:1 multiplexers 42 to select the 1-bit element from pseudo-tag register 33 corresponding to the register identified by x86 src1 and x86_src2. These 1-bit elements, along with stack identifiers x86_src1 and x86_src2 and the desired stack operation for each register, are then input to a stack exception logic 43. The stack identifier and the desired stack operation inputs are used to determine which 1-bit element from multiplexer 42 is associated with which stack operation. Stack exception logic 43 then compares each of the 1-bit elements with its corresponding stack operation to detect whether a stack exception exists for the desired operation, i.e., if no stack exceptions exist, then there are valid operand(s) for the desired operation. For example, if x86_src1 indicates that the x86 instruction requires a push operation on data register R0 and pseudo-tag register 33 indicates that register R0 is not empty, stack exception logic 43 will determine that a stack overflow exception exists, or if x86_src2 indicates that the x86 instruction requires a pop operation on data register R7 and pseudo-tag register 33 indicates that register R7 is empty, stack exception logic 43 will determine that a stack underflow exception exists.

Figure 5A:
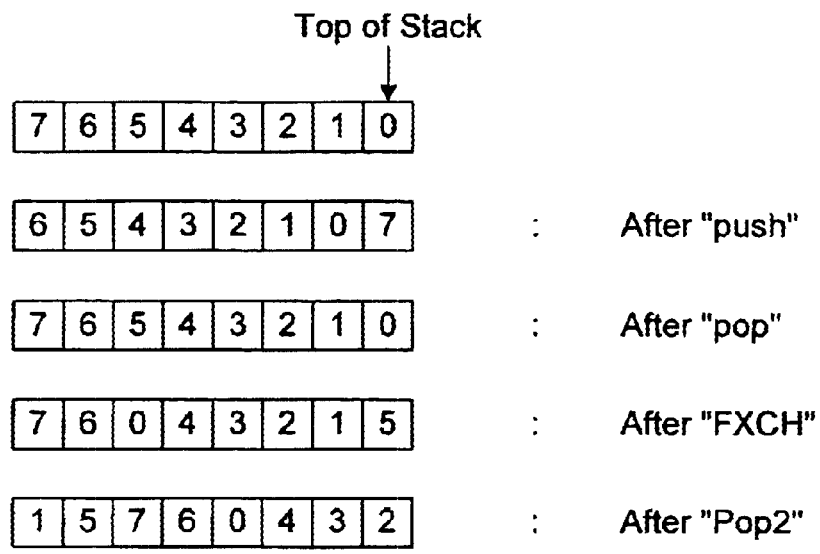
FIGS. 5A and 5B show examples of some x86 operations carried out using the present invention.
Figure 5B:
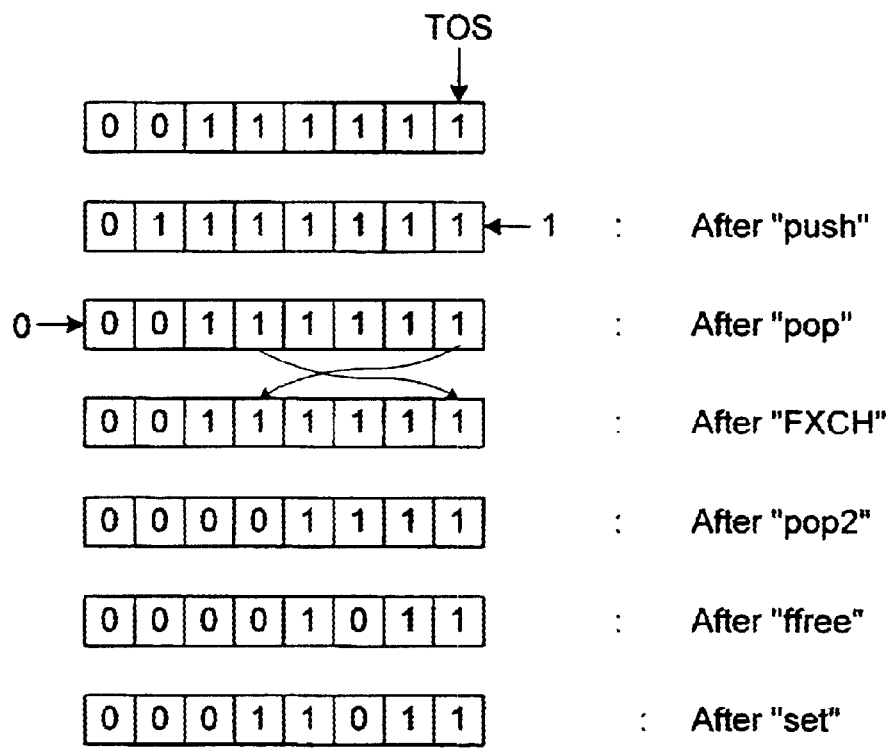

The 3-bit elements from stack-map register 35 and the 1-bit elements from pseudo-tag register 33 are also input to a stack-map and pseudo-tag logic 44. Instructions to carry out x86 operations, such as inc/dec, pop, ffree, FXCH, push, and set, are also input to logic 44. Logic 44 operates on the stack elements. The inc/dec operations increments/decrements the top of stack pointer by one. The pop operation removes an operand from the stack, the ffree operation marks an arbitrary element as empty, and the FXCH operation swaps two stack elements. The push operation adds a new operand to the stack, and the set operation marks an arbitrary element as non-empty. FIG. 5A shows some examples of manipulation of map pointers for stack operations, and FIG. 5B shows some examples of valid bit manipulation of stack operations.

The above-described embodiments of the present invention are merely meant to be illustrative and not limiting. For example, although the above-described embodiments were with reference to a multi-media processor, other types of operating environments and processors may also be suitable for use with this invention. It will thus be obvious to those skilled in the art that various changes and modifications may be made without departing from this invention in its broader aspects. Therefore, the appended claims encompass all such changes and modifications as fall within the true spirit and scope of this invention.

We claim:

1. A shared register system for a multi-instruction-set floating point processor, the shared register system comprising:

a set of first data registers, wherein the width of each of said first data registers supports a first instruction set;

a set of second data registers, wherein each of said second data registers comprises a plurality of said first data registers, and wherein the width of each of said second data registers supports a second instruction set; and an N-bit pseudo-tag register, wherein each bit in said pseudo-tag register represents the state of a corresponding one of said second data registers.

2. The system of claim 1, wherein each of said first data registers is 64 bits wide.

3. The system of claim 2, wherein said first instruction set is native to said floating point processor.

4. The system of claim 1, wherein said second instruction set is an x86 instruction set.

5. The system of claim 4, wherein said first instruction set is native to said floating point processor.

6. The system of claim 1, wherein M equals 8.

7. The system of claim 1, wherein said bits in said pseudo-tag register indicate whether a corresponding second data register is empty.

8. The system of claim 1, further comprising a stack-map register, wherein said stack-map register maps an x86 instruction register set to said set of second data registers.

9. The system of claim 8, wherein said stack-map register contains eight 3-bit elements, and wherein each of said 3-bit elements represents one of eight registers in said x86 instruction register set.

10. The system of claim 1, further comprising a stack-map register and a logic unit coupled to said stack-map register and said pseudo-tag register, wherein said stack-map register maps an x86 instruction register set to said set of second data registers.

11. The system of claim 10, wherein said logic unit executes instructions to carry out x86 operations.

12. The system of claim 11, wherein said instructions comprise inc/dec, pop, ffree, FXCH, push, and set instructions.

* * * * *